US012579870B2

(12) United States Patent
Sung et al.

(10) Patent No.: US 12,579,870 B2
(45) Date of Patent: Mar. 17, 2026

(54) WIRELESS SIGNAL MONITORING METHOD IN PRIVATE NETWORK FIELD

(71) Applicant: Compal Electronics, Inc., Taipei City (TW)

(72) Inventors: Meng-Yuan Sung, Taipei City (TW); Yen-Tsung Chia, Taipei City (TW)

(73) Assignee: Compal Electronics, Inc., Taipei (TW)

( * ) Notice: Subject to any disclaimer, the term of this patent is extended or adjusted under 35 U.S.C. 154(b) by 53 days.

(21) Appl. No.: 18/908,251

(22) Filed: Oct. 7, 2024

(65) Prior Publication Data

US 2026/0057750 A1 Feb. 26, 2026

(30) Foreign Application Priority Data

Aug. 23, 2024 (TW) ................................. 113131920

(51) Int. Cl.
*G08B 13/187* (2006.01)
*G08B 13/196* (2006.01)
*H04B 17/318* (2015.01)

(52) U.S. Cl.
CPC ..... *G08B 13/187* (2013.01); *G08B 13/19602* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 10,797,938 B2 | 10/2020 | Tiwari et al. | |
| 11,588,699 B2 | 2/2023 | Thompson et al. | |
| 2008/0089276 A1* | 4/2008 | Ito ......................... | H04W 36/08 |
| | | | 370/328 |
| 2015/0024769 A1* | 1/2015 | Chen ..................... | H04W 48/20 |
| | | | 455/452.2 |
| 2018/0129881 A1* | 5/2018 | Seeber .................. | G06V 20/52 |
| 2020/0327688 A1* | 10/2020 | Hsieh ....................... | H01Q 1/28 |
| 2024/0353861 A1* | 10/2024 | Tan ....................... | G05D 1/6985 |

FOREIGN PATENT DOCUMENTS

| | | | | |
|---|---|---|---|---|
| CN | 109451526 A | * | 3/2019 | ........... H04B 17/318 |
| CN | 109560881 A | | 4/2019 | |
| CN | 111585643 A | | 8/2020 | |
| CN | 112702579 A | | 4/2021 | |
| CN | 116170811 A | | 5/2023 | |
| CN | 118317350 A | | 7/2024 | |
| TW | I730605 B | | 6/2021 | |
| TW | I778772 B | | 9/2022 | |
| TW | M644142 U | | 7/2023 | |

* cited by examiner

*Primary Examiner* — Muhammad Adnan
(74) *Attorney, Agent, or Firm* — KIRTON McCONKIE; Evan R. Witt

(57) ABSTRACT
A wireless signal monitoring method is used in a private network field. A mobile image pickup device is used to patrol the private network field. If a wireless signal from a wireless terminal device is abnormal, the mobile image pickup device takes photos at a preset position in the private network field. Furthermore, after the cause of the wireless signal abnormality is analyzed, a warning signal is issued to notify that there is physical interference in the private network field.

12 Claims, 3 Drawing Sheets

WIRELESS SIGNAL MONITORING METHOD IN PRIVATE NETWORK FIELD

CROSS-REFERENCE TO RELATED APPLICATIONS

This application claims priority to Taiwan Patent Application No. 113131920, filed on Aug. 23, 2024. The entire contents of the above-mentioned patent application are incorporated herein by reference for all purposes.

FIELD OF THE INVENTION

The present disclosure relates to a wireless signal monitoring method, and more particularly to a wireless signal monitoring method in a private network field.

BACKGROUND OF THE INVENTION

With the development of wireless device technology, the applications related to wireless mobile networks have become increasingly widespread. The stability of the field signal of wireless devices is crucial to the smooth operation of applications in wireless mobile networks.

Wireless devices can be installed in a private network field to monitor wireless signals. Generally, wireless signals in the private network field are usually monitored through a manual inspection method, a fixed monitoring method or a signal strength map monitoring method.

For implementing the manual inspection method, the maintenance personnels carry detection instruments to regularly patrol the private network field to check the signal strength and quality. Although the manual inspection method offers high detection flexibility and is able to specifically check suspicious areas, it is inefficient and costly. In addition, the manual inspection method is readily affected by factors such as weather.

For implementing the fixed monitoring method, fixed monitoring devices are deployed within in the private network field to continuously monitor the signal strength and quality in real-time. Although fixed monitoring devices have the advantage of real-time monitoring the signal strength and quality, the fixed monitoring method still has some drawbacks. For example, the deployment cost is high, and the deployment flexibility is insufficient.

For implementing the signal strength map monitoring method, a signal strength map is firstly generated according to the strength of signals emitted by wireless devices within the private network field, and thus the maintenance personnel use the signal strength map to identify areas with abnormal signals. Although the signal strength map monitoring method is cost-effective, the accuracy is not satisfied. In addition, this method can only detect signal strength anomalies. In other words, this method is unable to realize the causes of these anomalies.

Therefore, there is a need of providing an improved wireless signal monitoring method in the private network field in order to overcome the drawbacks of the conventional technologies.

SUMMARY OF THE INVENTION

The present invention provides a wireless signal monitoring method in a private network field. The wireless signal monitoring method in the private network field utilizes a mobile image pickup device to patrol the private network field. If the wireless signal from a wireless terminal device is abnormal, the mobile image pickup device takes photos of a preset area in the private network field. According to the photographing result, the causes of the wireless signal abnormality are analyzed and warned. Consequently, the monitoring efficiency and accuracy will be enhanced. Additionally, since the mobile image pickup device is relatively cost-effective and its maintenance cost is low, the production cost of establishing the private network field will be reduced. Furthermore, since the mobile image pickup device can be moved flexibly, the deployment location of the mobile image pickup device is not restricted.

In accordance with an aspect of the present invention, a wireless signal monitoring method in the private network field is provided. The wireless signal monitoring method in the private network field includes steps of:

(S1) establishing a private network field comprising at least one wireless base station, at least one wireless terminal device, a control center and an mobile image pickup device, wherein each of the at least one wireless base station is equipped with an antenna, each of the at least one wireless base station is dispersedly installed in the private network field, each of the at least one wireless terminal device is within a transmission range of a wireless signal from the antenna of the corresponding wireless base station, the at least one wireless base station and the corresponding wireless terminal device are uniquely paired with each other, the mobile image pickup device has a photographing function and a wireless signal transmission function, and the at least one wireless base station and the at least one wireless terminal device are in communication with the control center;

(S2) performing a flow test on the at least one wireless terminal device to confirm that a wireless connection quality of the at least one wireless terminal device is normal;

(S3) the control center driving the mobile image pickup device to periodically move to at least one preset position and take at least one initial area photo at each time, wherein the at least one initial area photo is transmitted from the mobile image pickup device to the control center via wireless transmission, wherein an arrangement of all objects in the private network field at an initial time is established according to the at least one initial area photo;

(S4) the control center periodically receiving a wireless signal report from the at least one wireless terminal device, and periodically analyzing a strength of the wireless signal from the at least one wireless terminal device according to the wireless signal report;

(S5) the control center judging whether the strength of the wireless signal from any of the at least one wireless terminal device is lower than a threshold value, wherein if a judging condition of the step (S5) is not satisfied, the step (S4) is performed again; and (S6) if a judging result of the step (S5) indicates that the strength of the wireless signal from a specified wireless terminal device of the at least one wireless terminal device is lower than the threshold value, the control center driving the mobile image pickup device to move to the preset position corresponding to the specified wireless terminal device to capture at least one current area photo, wherein after the control centers receives the at least one current area photo from the mobile image pickup device, the control center judges whether an abnormal condition is generated according to a comparing result of an image feature of the at least one initial area photo and an image feature of the at least one current area photo taken at a same position.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is noted that the following descriptions of the preferred embodiments of the present invention are presented herein for purpose of illustration and description only. It is not intended to be exhaustive or to be limited to the precise from disclosed.

Figure 1:
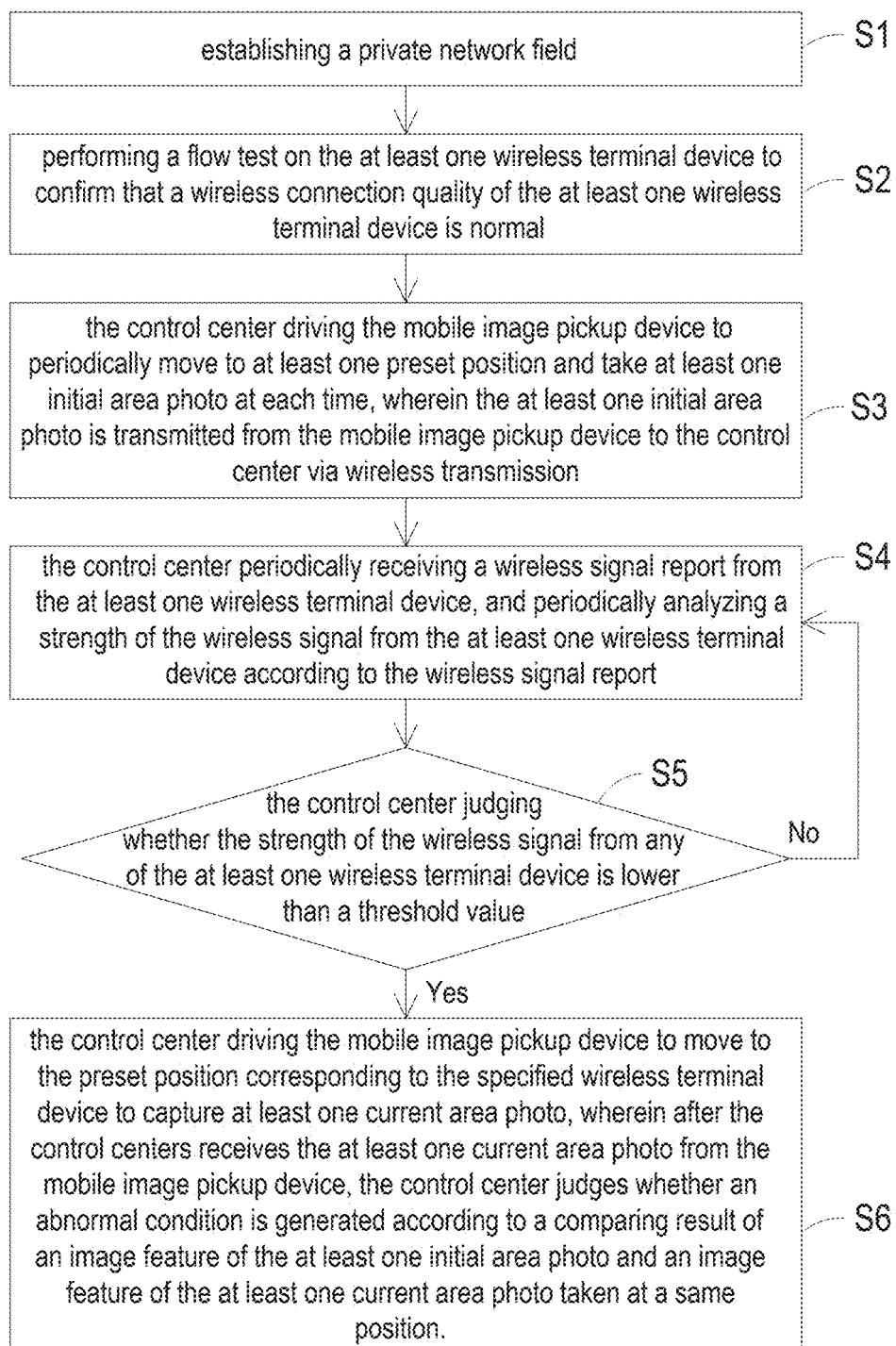
FIG. 1 is a schematic flowchart illustrating a wireless signal monitoring method in a private network field according to an embodiment of the present invention.
Figure 2:
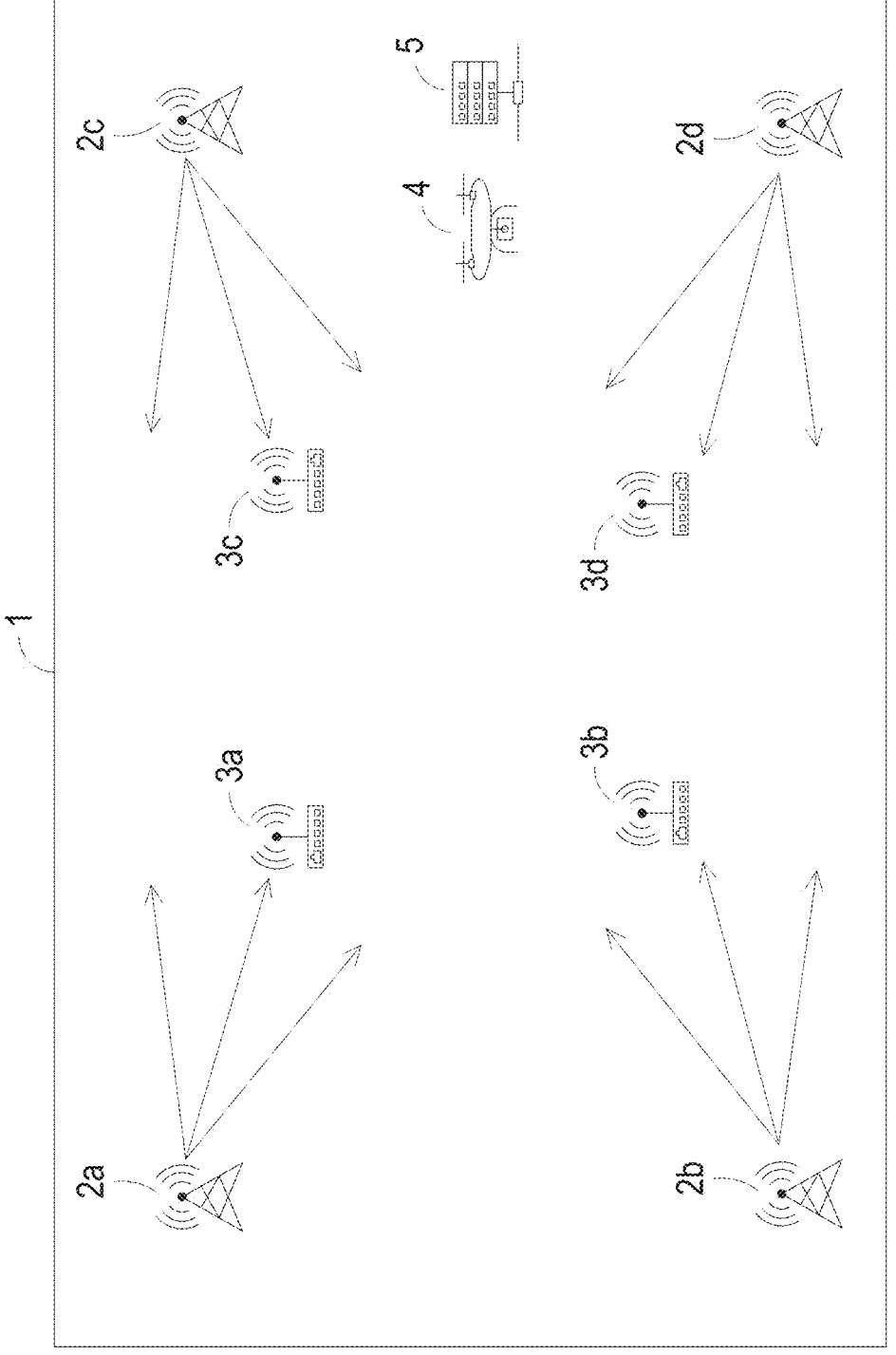
FIG. 2 is a schematic diagram illustrating the architecture of the private network field using the wireless signal monitoring method shown in FIG. 1.
Figure 3:
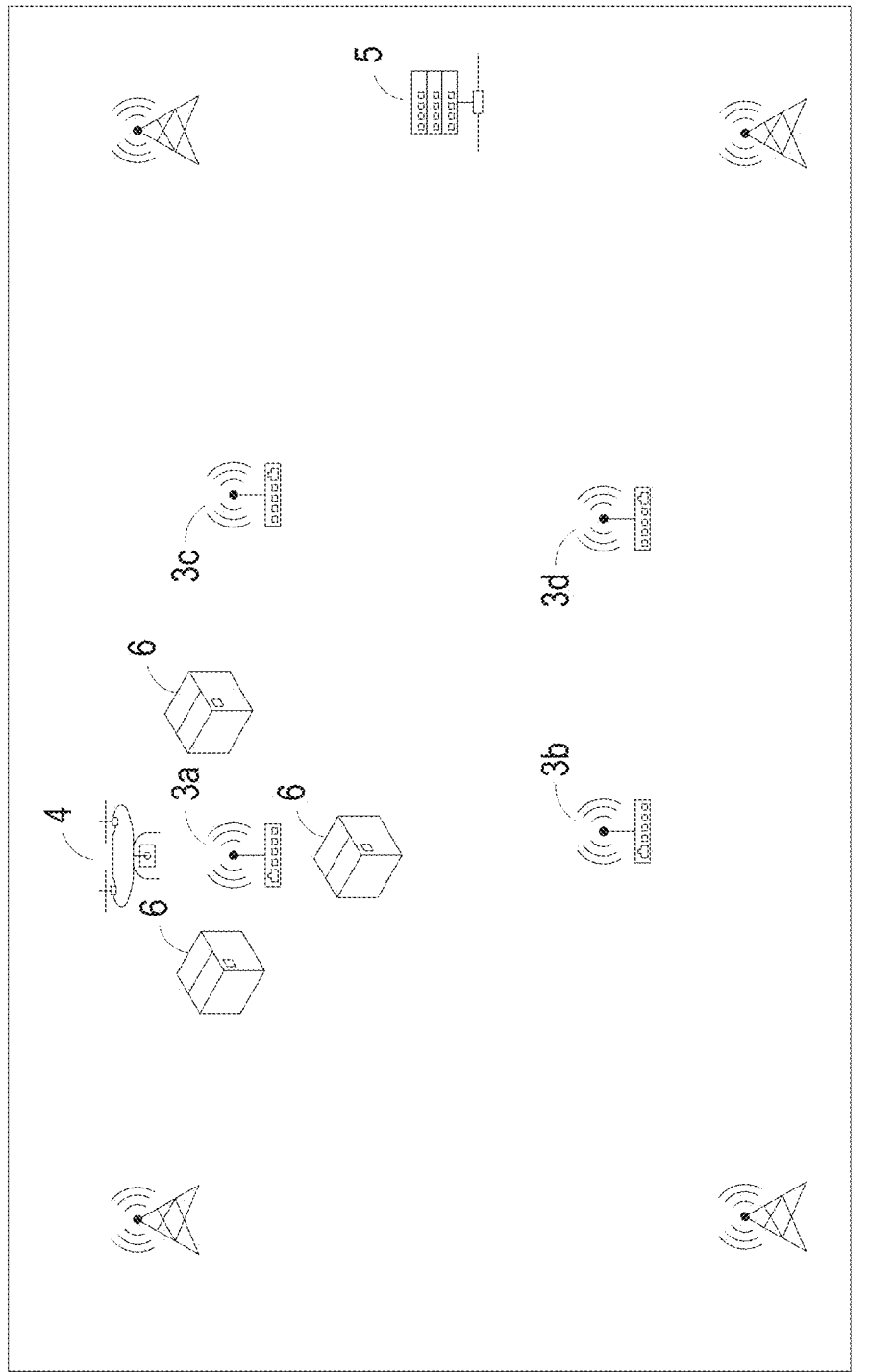
FIG. 3 is a schematic diagram illustrating the architecture of the private network field of FIG. 2, in which a mobile image pickup device is moved to a wireless terminal device to take photos.

FIG. 1 is a schematic flowchart illustrating a wireless signal monitoring method in a private network field according to an embodiment of the present invention. FIG. 2 is a schematic diagram illustrating the architecture of the private network field using the wireless signal monitoring method shown in FIG. 1. FIG. 3 is a schematic diagram illustrating the architecture of the private network field of FIG. 2, in which a mobile image pickup device is moved to a wireless terminal device to take photos. The wireless signal monitoring method in this embodiment is applied to a private network field 1. The private network field 1 comprises at least one wireless base station, at least one wireless terminal device, a mobile image pickup device 4 and a control center 5.

Each wireless base station is equipped with an antenna. As shown in FIG. 2, there are four wireless base stations 2a, 2b, 2c and 2d in the private network field 1. The four wireless base stations 2a, 2b, 2c and 2d are dispersedly installed in the private network field 1. For example, the four wireless base stations 2a, 2b, 2c and 2d are located at the four corners of the private network field 1. Since the wireless base stations are dispersedly installed, the coverage range of the wireless signals emitted by all the wireless base stations includes the entire of the private network field 1. In addition, the wireless base stations 2a, 2b, 2c and 2d are in communication with the control center 5 in a wireless transmission manner. In addition, the wireless base stations 2a, 2b, 2c and 2d periodically issue strength and quality reports of the respective wireless signals to the control center 5. Preferably but not exclusively, the wireless signals are in accordance with 5G, 4G, 3G, beyond 5G, Wi-Fi or other communication protocols.

It is noted that the number of the wireless base stations is not restricted. The number of the wireless base stations may be determined according to the practical requirements. Preferably, the number of the wireless terminal devices matches the number of the wireless base stations. For example, as shown in FIG. 2, four wireless terminal devices 3a, 3b, 3c and 3d are included in the private network field 1. These wireless terminal device 3a, 3b, 3c and 3d are respectively located beside the corresponding wireless base stations 2a, 2b, 2c and 2d. For example, the wireless terminal device 3a is located beside the wireless base station 2a, the wireless terminal device 3b is located beside the wireless base station 2b, the wireless terminal device 3c is located beside the wireless base station 2c, and the wireless terminal device 3d is located beside the wireless base station 2d. Preferably, the wireless terminal devices 3a, 3b, 3c, 3d are within the transmission ranges of the wireless signals emitted by the antennas of the respective wireless base stations 2a, 2b, 2c, 2d. When the wireless base stations 2a, 2b, 2c and 2d emit wireless signals through the corresponding antennas, the corresponding antennas of the wireless base stations 2a, 2b, 2c and 2d are respectively pointed to the corresponding wireless terminal devices 3a, 3b, 3c and 3d. Consequently, the wireless base station 2a, 2b, 2c, 2d are uniquely paired with the corresponding wireless terminal devices 3a, 3b, 3c and 3d, respectively. For example, the wireless terminal device 3a is paired with the wireless base station 2a, the wireless terminal device 3b is paired with the wireless base station 2b, the wireless terminal device 3c is paired with the wireless base station 2c, and the wireless terminal device 3d is paired with the wireless base station 2d. Moreover, the wireless terminal devices 3a, 3b, 3c and 3d are in communication with the control centers 5 in the wireless transmission manner. In addition, the wireless terminal devices 3a, 3b, 3c and 3d periodically issue strength and quality reports of the respective wireless signals to the control center 5. Preferably but not exclusively, the wireless terminal devices 3a, 3b, 3c and 3d can be mobile phones, laptops, tablets or other electronic devices that provide wireless communication and information services. In an embodiment, after a flow test is performed on each of the wireless terminal devices 3a, 3b, 3c and 3d, the control center 5 can confirm whether the wireless connection quality of each of the wireless terminal devices 3a, 3b, 3c and 3d is normal.

In some embodiments, the antennas of the wireless base stations 2a, 2b, 2c, 2d can respectively receive wireless signals from the wireless terminal devices 3a, 3b, 3c, 3d in the private network field 1. After the wireless signals from the corresponding wireless terminal devices 3a, 3b, 3c, 3d in the private network field 1 are received, the wireless base stations 2a, 2b, 2c and 2d analyze the received wireless signals to determine the strengths and directions of the wireless signals. The strengths of the wireless signals can be indicated by signal quality indicators. For example, the signal quality indicator includes a received signal strength indication (RSSI), a reference signal receiving power (RSRP), a signal-to-interference-plus-noise ratio (SINR) or a Drop Rate. In addition, the directions of the wireless signals can be indicated by the Angle of Arrival (AoA).

In some embodiments, the wireless base stations 2a, 2b, 2c and 2d use a beamforming technology to analyze the wireless signals from the corresponding wireless terminal devices in the private network field 1. By using the beamforming technology, radiation beams appointed to specified directions are formed through the adjustment of the phases and the amplitudes of the antenna arrays of the wireless base stations 2a, 2b, 2c and 2d. Since the radiation beams are pointed to different directions, the wireless base stations 2a, 2b, 2c and 2d can detect the signal strengths and directions from various directions. Consequently, the antennas of the wireless base stations 2a, 2b, 2c and 2d can be adjusted to point to the directions where the wireless signals are the strongest.

In an embodiment, after the wireless base stations 2a, 2b, 2c and 2d in the private network field 1 are set up, the effective leading edge area corresponding to the top 5% strongest beamforming signals will be obtained by measuring the antenna of each of the wireless base stations 2a, 2b, 2c and 2d. Consequently, each of the wireless terminal devices is deployed in the effective leading edge area corresponding to the top 5% strongest beamforming signals. Furthermore, the physical cell identity (PCI) parameters of the wireless terminal devices 3a, 3b, 3c and 3d lock the PCI parameters of the wireless base stations 2a, 2b, 2c and 2d. Consequently, each of the wireless base stations 2a, 2b, 2c and 2d and the corresponding one of the wireless terminal devices 3a, 3b, 3c and 3d are uniquely paired with each other.

In this embodiment, the mobile image pickup device 4 is a drone with wireless communication and photography capabilities. It is noted that the example of the mobile image pickup device 4 is not restricted. For example, any mobile device with the wireless communication and photography capabilities (e.g., an unmanned vehicle) is suitably used as the mobile image pickup device 4. The mobile image pickup device 4 is driven and controlled by the control center 5. In the early setup stage of the private network field 1, the mobile image pickup device 4 is periodically moved to at least one preset position to take at least one initial area photo of the corresponding area. The at least one initial area photo obtained at this time reflects that there are no objects causing physical interference in the private network field 1. Furthermore, the at least one initial area photo taken at each time is transmitted to the control center 5 via wireless transmission. Consequently, the arrangement of all objects in the private network field 1 at the initial time is established according to all of the initial area photos. If the wireless signal from any of the wireless terminal devices 3a, 3b, 3c and 3d is abnormal, the mobile image pickup device 4 is driven by the control center 5 and moved to the preset position corresponding to the abnormal wireless terminal device. Then, the mobile image pickup device 4 takes at least one current area photo, and the at least one current area photo is transmitted to the control center 5. Preferably, the preset position of the mobile image pickup device 4 for taking the initial area photo and the position of the mobile image pickup device 4 for taking the current area photo are identical.

The control center 5 judges whether the wireless signal from any of the wireless terminal devices 3a, 3b, 3c and 3d is abnormal. If the wireless signal from any of the wireless terminal devices 3a, 3b, 3c and 3d is abnormal, the mobile image pickup device 4 is driven by the control center 5 and moved to the corresponding preset position to take the area photo. Moreover, each of the wireless terminal device 3a, 3b, 3c and 3d issues a wireless signal strength and quality report to the control center 5. According to the wireless signal strength and quality report, the control center 5 judges whether any wireless signal is abnormal. If the control center 5 judges that the wireless signal from any of the wireless terminal devices 3a, 3b, 3c and 3d is abnormal, for example, the strength of the wireless signal is lower than a threshold value, the mobile image pickup device 4 is driven to the preset position corresponding to the abnormal wireless terminal device to take at least one current area photo. After the at least one current area photo from the mobile image pickup device 4 is received by the control center 5, the image features of the at least one initial area photo and the at least one current area photo taken at the same position are compared with each other by the control center 5. According to the comparing result, the control center 5 judges whether there is an abnormal condition.

In some embodiments, the control center 5 identifies the position changes of the objects in the private network field 1 and provide associated recommendations through AI image analysis. For example, the control center 5 judges whether a difference value between an image feature of the initial area photo and the image feature of the current area photo is higher than a preset value. According to this judging result, the control center 5 assess whether the arrangement of objects in the private network field 1 causes abnormalities of the wireless signals from the wireless terminal devices. Moreover, if the control center 5 judges that the difference value is higher than the preset value, the control center 5 judges that the wireless signal is abnormal. Under this circumstance, the control center 5 issues a warning signal to notify that there is physical interference in the private network field 1. For example, as shown in FIG. 3, there is an additional object 6 (e.g., a metal substance) in the private network field 1. Due to the presence of the additional object 6, the wireless signal from the wireless terminal device 3a is suffered from the physical interference and thus abnormal. Under this circumstance, the control center 5 will identify the physical interference in the private network field 1 according to the aforementioned analysis.

In some embodiments, the control center 5 may have a built-in original model specific to the private network field 1. For example, the built-in original model is a CNN VGG16 model. After the original model is trained through the image features of the initial area photos and the current area photos, the parameters of the original model can be properly adjusted.

In some embodiments, the control center 5 further uses the original model to judge whether the difference value between the image feature of the at least one initial area photo and the image feature of the at least one current area photo is higher than the preset value according to the image similarity based on a Convolutional Neural Network (CNN). According to the judging result, the control center 5 further judges whether any wireless signal is abnormal.

As mentioned above, the signal quality indicator includes the received signal strength indication (RSSI), the reference signal receiving power (RSRP), the signal-to-interference-plus-noise ratio (SINR) the Drop Rate. In case that the strength and quality of the wireless signal is indicated as the Received Signal Strength Indication (RSSI), the threshold value of RSSI is −70 dBm. In case that the strength and quality of the wireless signal is indicated as the Drop Rate, the threshold value of Drop Rate is 99%.

Please refer to FIG. 1 again. In an embodiment, the wireless signal monitoring method in the private network field includes the following steps.

Firstly, in a step S1, a private network field 1 is established. The private network field 1 comprises at least one wireless base stations (e.g., four wireless base stations 3a, 3b, 3c and 3d), at least one wireless terminal device (e.g., four wireless terminal devices 2a, 2b, 2c and 2d), a control center 5 and a mobile image pickup device 4. The wireless base stations are dispersedly installed in the private network field 1. Each of the wireless base stations 2a, 2b, 2c and 2d is equipped with an antenna. Preferably, the wireless terminal devices 3a, 3b, 3c and 3d are within the transmission range of the wireless signals from the antennas of the respective wireless base stations 2a, 2b, 2c and 2d. In addition, the wireless base station 2*a*, 2*b*, 2*c* and 2*d* are uniquely paired with the corresponding wireless terminal devices 3*a*, 3*b*, 3*c* and 3*d*, respectively.

Then, in a step S2, a flow test is performed on each of the wireless terminal devices 3*a*, 3*b*, 3*c* and 3*d* to confirm whether the wireless connection quality of each of the wireless terminal devices 3*a*, 3*b*, 3*c* and 3*d* is normal.

In a step S3, the control center 5 periodically drives the mobile image pickup device 4 to move to at least one preset position and take at least one initial area photo. Furthermore, the initial area photo taken at each time is transmitted to the control center 5 via wireless transmission.

In a step S4, the control center 5 periodically receives the wireless signal strength and quality reports from the wireless terminal devices 3*a*, 3*b*, 3*c* and 3*d* and periodically analyzes the strength of the wireless signals from the wireless terminal devices 3*a*, 3*b*, 3*c* and 3*d* according to the wireless signal strength and quality reports.

In a step S5, the control center 5 judges whether the strength of the wireless signal from each of the wireless terminal devices 3*a*, 3*b*, 3*c* and 3*d* is higher than a preset value. If the judging condition of the step S5 is not satisfied, the step S4 is performed again. Whereas, if the judging condition of the step S5 is satisfied, a step S6 is performed.

In the step S6, if the control center 5 drives the mobile image pickup device 4 to move to the preset position corresponding to the abnormal wireless terminal device and take at least one current area photo. After the at least one current area picture from the mobile image pickup device 4 is received by the control center 5, the image features of the at least one initial area photo and the at least one current area photo at the same position are compared with each other by the control center 5. According to the comparing result, the control center 5 judges whether there is an abnormal condition.

In some embodiments, the mobile image pickup device 4 further has a capability of capturing wireless signal. In the step S3, the mobile image pickup device 4 is driven and controlled by the control center 5. In the early setup stage of the private network field 1, the mobile image pickup device 4 is periodically moved to the at least one preset position. Meanwhile, the mobile image pickup device 4 captures the strength of the wireless signal in the preset position. Then, the captured result is transmitted back to the control center 5 via wireless communication. According to the captured result, the control center 5 generates a heat-map.

From the above descriptions, the present invention provides a wireless signal monitoring method in a private network field. The wireless signal monitoring method in the private network field utilizes a mobile image pickup device to patrol the private network field. If the wireless signal from a wireless terminal device is abnormal, the mobile image pickup device takes photos of a preset area in the private network field. According to the photographing result, the cause of the wireless signal abnormality is analyzed and warned. Consequently, the monitoring efficiency and accuracy will be enhanced. Additionally, since the mobile image pickup device is relatively cost-effective and its maintenance cost is low, the production cost of establishing the private network field will be reduced. Furthermore, since the mobile image pickup device can be moved flexibly, the deployment location of the mobile image pickup device is not restricted.

What is claimed is:

1. A wireless signal monitoring method in a private network field, the wireless signal monitoring method comprising steps of:

(S1) establishing a private network field comprising at least one wireless base station, at least one wireless terminal device, a control center and an mobile image pickup device, wherein each of the at least one wireless base station is equipped with an antenna, each of the at least one wireless base station is dispersedly installed in the private network field, each of the at least one wireless terminal device is within a transmission range of a wireless signal from the antenna of the corresponding wireless base station, the at least one wireless base station and the corresponding wireless terminal device are uniquely paired with each other, the mobile image pickup device has a photographing function and a wireless signal transmission function, and the at least one wireless base station and the at least one wireless terminal device are in communication with the control center;

(S2) performing a flow test on the at least one wireless terminal device to confirm that a wireless connection quality of the at least one wireless terminal device is normal;

(S3) the control center driving the mobile image pickup device to periodically move to at least one preset position and take at least one initial area photo at each time, wherein the at least one initial area photo is transmitted from the mobile image pickup device to the control center via wireless transmission, wherein an arrangement of all objects in the private network field at an initial time is established according to the at least one initial area photo;

(S4) the control center periodically receiving a wireless signal report from the at least one wireless terminal device, and periodically analyzing a strength of the wireless signal from the at least one wireless terminal device according to the wireless signal report;

(S5) the control center judging whether the strength of the wireless signal from any of the at least one wireless terminal device is lower than a threshold value, wherein if a judging condition of the step (S5) is not satisfied, the step (S4) is performed again; and (S6) if a judging result of the step (S5) indicates that the strength of the wireless signal from a specified wireless terminal device of the at least one wireless terminal device is lower than the threshold value, the control center driving the mobile image pickup device to move to the preset position corresponding to the specified wireless terminal device to capture at least one current area photo, wherein after the control centers receives the at least one current area photo from the mobile image pickup device, the control center judges whether an abnormal condition is generated according to a comparing result of an image feature of the at least one initial area photo and an image feature of the at least one current area photo taken at a same position.

2. The wireless signal monitoring method in the private network field according to claim 1, wherein the at least one wireless signal is in accordance with a 5G communication protocol, a 4G communication protocol, a 3G communication protocol, a beyond 5G communication protocol or a Wi-Fi communication protocol.

3. The wireless signal monitoring method in the private network field according to claim 1, wherein the strength of the at least one wireless signal is indicated as a received signal strength indication (RSSI) or a drop rate, wherein if the strength of the at least one wireless signal is indicated as the received signal strength indication (RSSI), the threshold value is −70 dBm, wherein if the strength of the at least one wireless signal is indicated as the drop rate, the threshold value is 99%.

4. The wireless signal monitoring method in the private network field according to claim 1, wherein in the step (S1), the antenna of the at least one wireless base station is pointed to the corresponding wireless terminal device.

5. The wireless signal monitoring method in the private network field according to claim 1, wherein in the step (S1), each of the at least one wireless terminal device is deployed in an effective leading edge area of the corresponding wireless base station having the top 5% strongest beam-forming signal.

6. The wireless signal monitoring method in the private network field according to claim 1, wherein a physical cell identity (PCI) parameter of the at least one wireless terminal device locks a PCI parameter of the corresponding wireless base station, so that the at least one wireless base station and the corresponding wireless terminal device are uniquely paired with each other.

7. The wireless signal monitoring method in the private network field according to claim 1, wherein the control center has a built-in original model for the private network field, wherein after the original model is trained through the image feature of the at least one initial area photo and the image feature of the at least one current area photo, a parameter of the original model is adjusted.

8. The wireless signal monitoring method in the private network field according to claim 7, wherein in the step (S6), the control center uses the original model to judge whether a difference value between the image feature of the at least one initial area photo and the image feature of the at least one current area photo is higher than a preset value according to an image similarity based on a Convolutional Neural Network (CNN), wherein if the difference value is higher than the preset value, the control center judges that the abnormal condition is generated.

9. The wireless signal monitoring method in the private network field according to claim 8, wherein if the control center judges that the abnormal condition is generated, the control center issues a warning signal.

10. The wireless signal monitoring method in the private network field according to claim 1, wherein the mobile image pickup device has a capability of capturing wireless signal, wherein in the step (S3), the mobile image pickup device is driven and controlled by the control center, and the mobile image pickup device is periodically moved to the at least one preset position in an early setup stage, wherein the mobile image pickup device captures a strength of the wireless signal in the preset position, and a captured result is transmitted back to the control center via wireless communication, wherein according to the captured result, the control center generates a heat-map.

11. The wireless signal monitoring method in the private network field according to claim 1, wherein the strength of the wireless signal is indicated as a reference signal receiving power (RSRP) or a signal-to-interference-plus-noise ratio (SINR).

12. The wireless signal monitoring method in the private network field according to claim 1, wherein the at least one wireless base station uses a beamforming technology to analyze the wireless signal from the corresponding wireless terminal device.

* * * * *